UNITED STATES PATENT OFFICE.

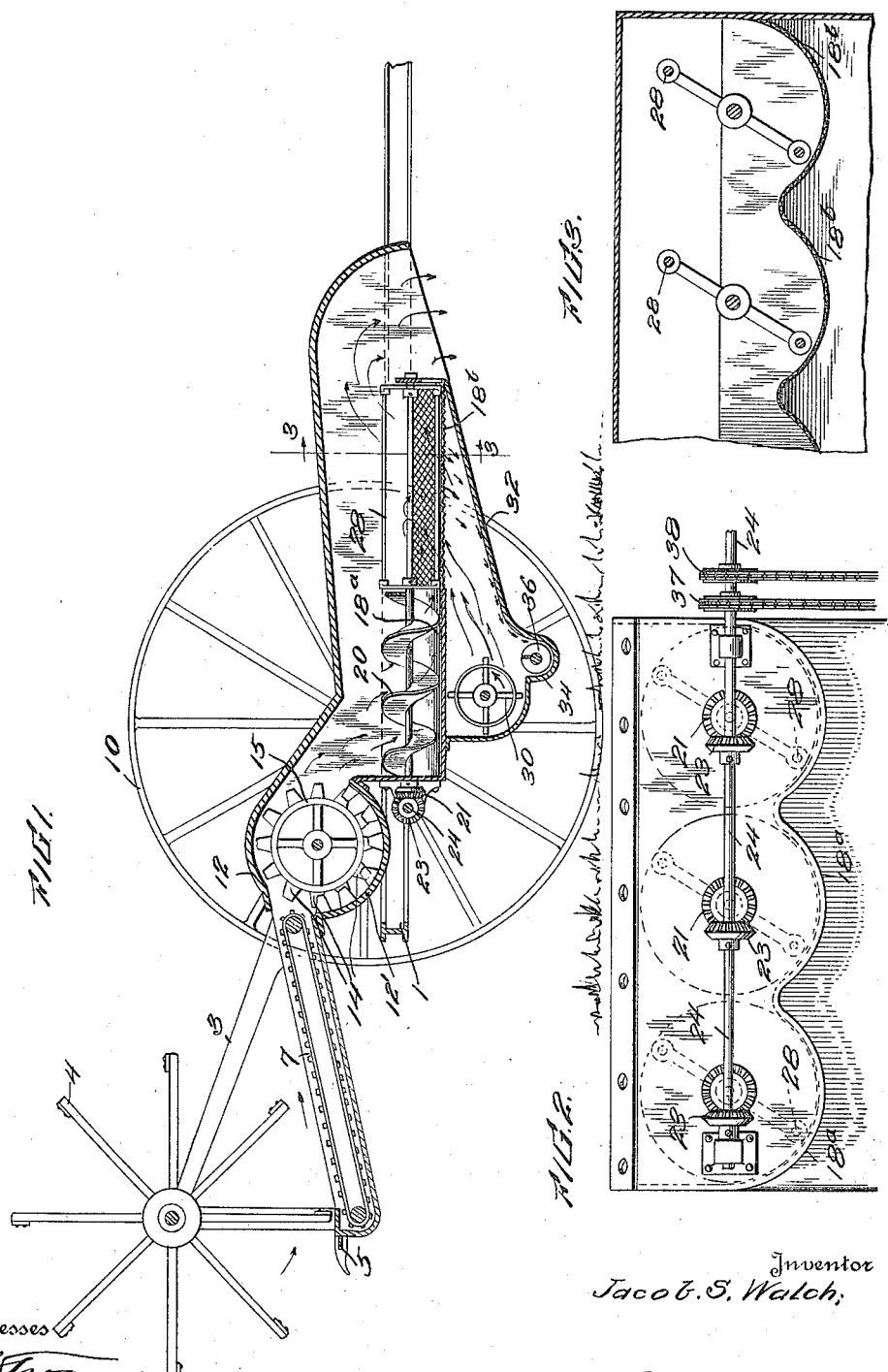

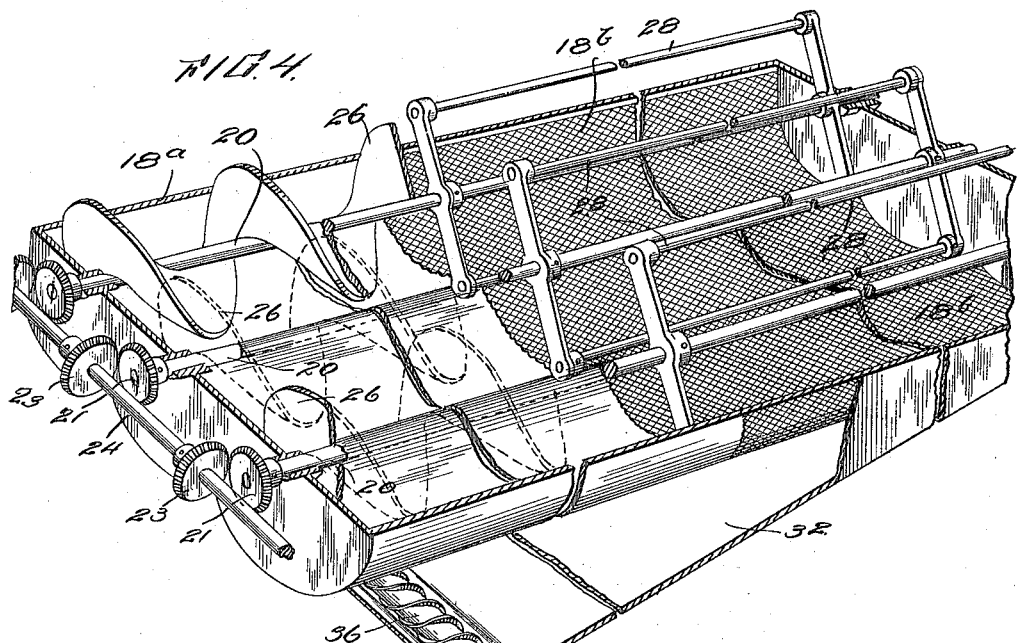
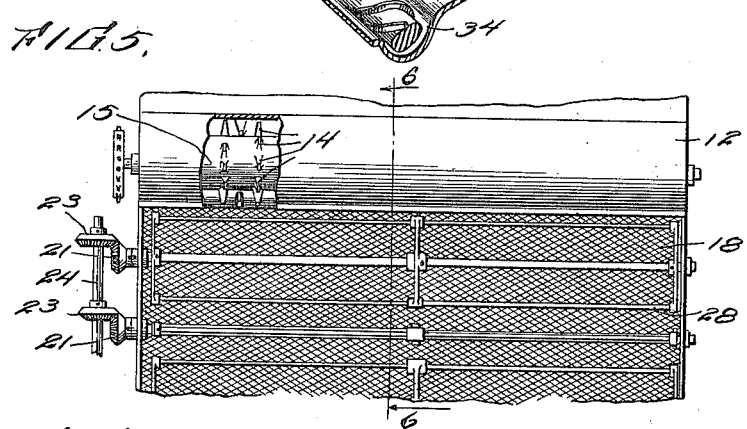
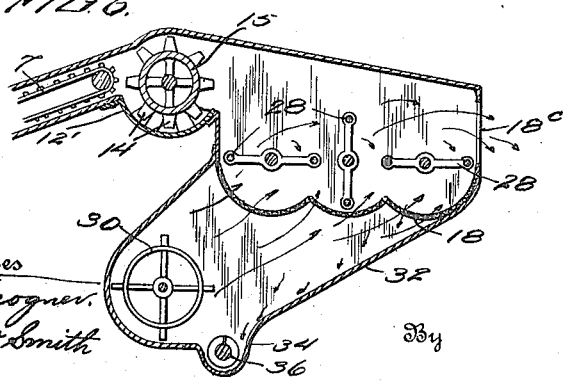

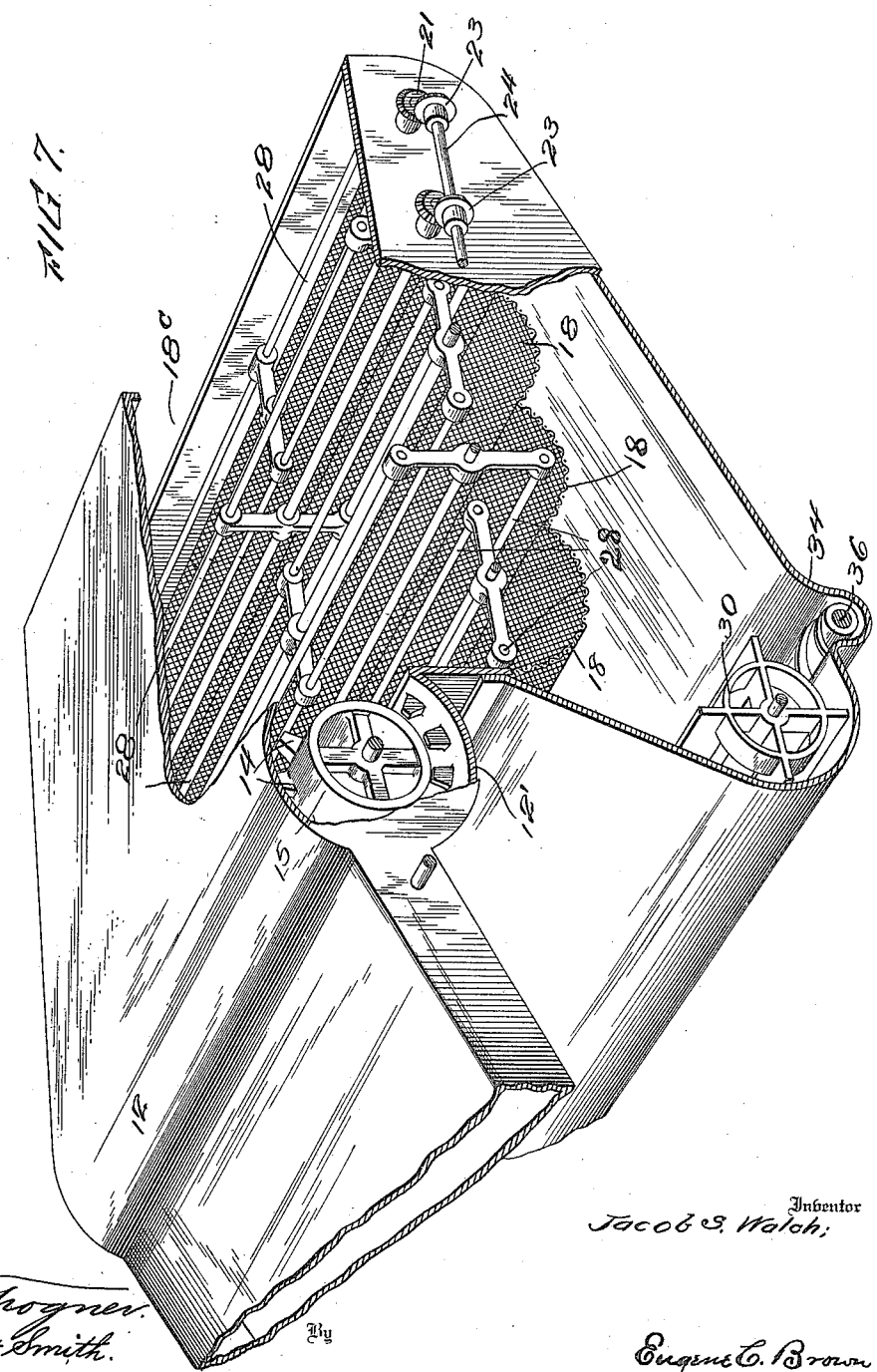

JACOB S. WALCH, OF WALLA WALLA, WASHINGTON.

GRAIN-SEPARATOR.

1,158,396.

Specification of Letters Patent.

Patented Oct. 26, 1915.

Application filed August 17, 1914. Serial No. 857,198.

*To all whom it may concern:*

Be it known that I, JACOB S. WALCH, a citizen of the United States, residing at Walla Walla, in the county of Walla Walla and State of Washington, have invented certain new and useful Improvements in Grain-Separators, of which the following is a specification.

My invention relates to improvements in grain separators for separating the grain from the chaff and straw after it has passed through the threshing cylinder.

The apparatus is intended more particularly for use in conjunction with threshing or harvester machines in which the grain is cut, threshed, cleaned and sacked in a continuous progression, but it may be employed separately as a grain cleaner. It may also be substituted for the usual shaking screens in harvesting machines which are already built.

One of the objects of my invention is to provide an apparatus which will separate the grain more thoroughly and with greater rapidity than the usual type in which the separation is effected by shaking or reciprocating the screens.

Another object is to enhance the efficiency of such apparatus and thereby reduce the amount of power necessary and the cost of operation.

With these and other objects in view I will describe the essential features of my invention in connection with the accompanying drawings, in which—

Figure 1 is a longitudinal section of a threshing machine showing one form of my grain separator in operative relation with the threshing cylinder; Fig. 2 is a front elevation of the separator; Fig. 3 is a sectional view on the line 3—3 of Fig. 1; Fig. 4 is a perspective view of the separator with the casing partly broken away; and Figs. 5, 6 and 7 are top plan longitudinal section and perspective views respectively, of a modification of my separator.

In Fig. 1, I have shown my grain separator in connection with the usual cutting and threshing mechanism and which will be readily understood by those familiar with harvesting machinery. To the main platform 1, of the threshing machine is pivoted a frame 3, which carries the reel 4, cutter bar 5 and conveyer apron 7, to which motion may be applied through a belt or chain connecting with a gear or pulley on the traction wheels 10, in the usual manner. The cut grain is conveyed from the cutter bar 5, over the traveling apron 7, to the cylinder housing formed by the concaves 12, 12', where it is threshed by the teeth or beaters 14 of the threshing cylinder 15.

The mixed grain chaff and straw pass from the threshing cylinder into the forward ends of my grain separator which is more clearly shown in Fig. 4. The separator comprises a sieve having a plurality of concave portions or troughs having closed ends. The forward portion 18$^a$ of each concave portion, is imperforate and receives the mixed grain and chaff from the threshing cylinder. The opposite end of each concave portion or trough 18$^b$, is reticulated or a wire mesh forming a sieve or screen through which the grain may pass.

A shaft 20, journaled in the ends, extends longitudinally through each concave portion, and carries upon one end a gear 21, which is in mesh with a gear 23, upon a shaft 24, which is driven by the engine or other power operating the various parts of the harvesting machine.

The grain, chaff and straw received from the threshing cylinder is carried through the imperforate portion 18$^a$ by the screw conveyers 26, mounted upon the shafts 20, and deposited upon the reticulated or screen portions 18$^b$, where it is constantly agitated by the rotary beaters 28, also carried by the shafts 20. As soon as the grain and straw is deposited upon the screen or sieve 18$^b$, it is subjected to a strong air blast from the blower 30. These air currents coöperate with the beaters to thoroughly stir the mixture thereby permitting the grain to drop upon the sieve and pass through the meshes, falling upon the inclined bottom of the pan or hopper 32, and being deposited in the trough 34, from whence it is conveyed by the rotary worm 36, to the sacking apparatus. The blower and conveyer worm may be driven from the power shaft 24, by belts 37 and 38, or in any other suitable manner.

The upwardly and outwardly directed air currents passing through the sieve exert a lifting force upon the mixed grain and straw, which not only coöperates with the stirrers 28, to agitate the mixture and cause the grain to separate and fall through the sieve, but these air currents also propel the straw and chaff along the sieve and finally project it from the outer end thereof. The effect of the air blast upon the straw and chaff is increased toward the rear end of the sieve by the fact that the heavier grain has been removed during the passage along the sieve and as the stirring arms lift the straw, the air blast projects it over the ends as indicated by the arrows in Fig. 1.

As I have mentioned above, the shaking screens in existing threshing machines may be replaced with a set of my concave screens and thereby greatly enhance the efficiency of the grain separation. I have found in the actual operation of my separator that the screw propellers 20, in addition to conveying the grain from the receiving end to the sieves, also serve by their rotary motion to stir and agitate the mixture received from the threshing cylinder so that the heavier grain may gravitate to the bottom and therefore be in proper position to immediately pass through the sieve. During the travel through the imperforate portions 18$^a$, therefore, the mixture is rearranged and prepared for a more effective action of the air blast and stirrers as it is fed upon the sieve. The importance of this sequence of operations in the imperforate portion and in the sieves will be appreciated especially by those familiar with prior grain separating devices. By dividing the mixture as it leaves the threshing cylinder up into a plurality of separate portions the efficiency of the apparatus in thoroughly separating the grain is very greatly enhanced.

The concave form of the separator sections not only provides a large screening surface for the operation of the stirrers and the air blast but enables the separator to operate efficiently in all positions of the machine, even when it is tilted to one side or the other in traversing rough ground and hill sides, because the effect will merely be to shift the mixture slightly to one side of the center while still being retained in the trough, the operating surface of the concave screen remaining substantially unchanged. In this respect also my separator has a decided advantage over the usual type of separator screens in which the grain and straw may be shifted entirely to one side when the machine is tilted and massed together so that the screening action is materially reduced.

In some cases, especially where it is necessary to place the separator in a small space, as when replacing the separator in an old machine, I have found it desirable to place the screens longitudinally of the threshing cylinder so that the threshed mixture is deposited along the whole side of the adjacent sieve section as I have illustrated in Figs. 5, 6 and 7. In this form I dispense with the imperforate portion and the screw and extend the sieve 18 and the beaters the entire length of the separator. In this form I prefer to make the concave screen sections shallower, as shown in Figs. 6 and 7 which not only facilitates the transfer of straw and mixed grain from one sieve section to the next but also provides an extended gradual curve or shallower channel over which the stirrers sweep. In order to further contract the space occupied I have shown the arc of each section shortened, thereby bringing the shafts of the beaters closer together. In order to permit the beater arms to pass each other, I gear them to the driving shaft with the plane of the central beater perpendicular to the one upon either side, the gears maintaining the proper angular relation during the operation.

In the form shown in Figs. 5, 6 and 7, the blast from the blower 30, passes through the sieve sections transversely instead of longitudinally as in the arrangement shown in Figs. 1 to 4. The air currents, therefore, serve to transfer the straw and grain progressively sidewise from one section to another, this operation being assisted by the stirring and lifting action of the beater arms. By the time the straw and chaff have passed across the several sections and have been subjected to the combined action of the air blast and the stirrers, all of the grain has been sifted through the sieves and the straw and chaff pass out of the discharge opening 18$^c$ free from grain. It is preferable to extend the outer sides of the first and last sieve sections higher upon the sides as I have indicated.

I have described in detail the particular constructions illustrated in the accompanying drawings but I am aware that changes may be made therein within the scope of my claims and without departing from the spirit of my invention.

I claim:

1. In a threshing machine the combination with the threshing cylinder, of a grain separator comprising a member having a plurality of concave portions adapted to receive and divide the mixture of threshed grain, straw and chaff from the threshing cylinder into separate portions, each concave portion having imperforate and perforated or sieve portions, the imperforate portions being adjacent the threshing cylinder, worm conveyers operating in said imperforate portions to convey the grain and chaff to the sieve portions, stirring devices operating in said sieve portions, and a blower adapted to force currents of air upwardly against the separator and through the sieve portions to separate the chaff and to project it outwardly therefrom.

2. A grain separator, comprising a plurality of juxtaposed concave members having imperforate and perforated or sieve portions, the imperforate portions being adjacent the threshing cylinder, mechanism operable within the imperforate portions to agitate and convey mixtures of grain and straw therethrough, and stirring devices operable within the sieve portions to agitate the mixture and thereby facilitate the separation of the grain from the straw, and a blower to force currents of air upwardly against said concave members, the imperforate portions protecting the mixture from the air currents while it is being conveyed therethrough.

3. In a threshing machine, the combination with a threshing cylinder, of a grain separator adjacent the cylinder and having a plurality of juxtaposed concave portions, each having perforated or sieve portions, adapted to receive and divide the mixture of threshed grain, straw and chaff from the threshing cylinder into separate parts, stirring devices operable within the sieve portions to agitate the mixture and thereby facilitate the separation of the grain from the straw and chaff and interconnected driving mechanism for maintaining the relation of the stirrers during operation.

4. In a threshing machine, the combination with the threshing cylinder, of a grain separator having a sieve provided with a plurality of juxtaposed concave portions and located adjacent the threshing cylinder to receive and divide the mixture of threshed grain, straw and chaff from said cylinder into separate portions, stirring devices operating in said concave portions, and a blower to force air currents upwardly through said sieve to separate the grain from the straw and force the latter outwardly from the sieve.

5. In a threshing machine, the combination with the threshing cylinder, of a grain separator comprising a concave member having imperforate and sieve portions, the imperforate portion being adjacent the threshing cylinder and receiving the mixture of grain and chaff therefrom, conveying mechanism and a stirring device revoluble respectively within the imperforate and sieve portions of said member, and a blower to force air currents upwardly against said member, the imperforate portion acting to shield the mixture while it is being conveyed to the sieve portion.

6. A grain separator, comprising a plurality of juxtaposed concave members having perforated or sieve portions, adapted to receive and divide the mixture of threshed straw and grain from the threshing cylinder into a separate portion, stirring devices operable within the sieve portions to agitate the mixture and thereby facilitate the separation of the grain from the straw, and interconnected driving mechanism for maintaining the relation of the stirrers during the operation.

In testimony whereof I affix my signature in presence of two witnesses.

JACOB S. WALCH.

Witnesses:
 EUGENE C. BROWN,
 FRANCES LAZEROW.

Copies of this patent may be obtained for five cents each, by addressing the "Commissioner of Patents, Washington, D. C."